United States Patent [19]

Kresge et al.

[11] 4,340,924

[45] Jul. 20, 1982

[54] GRADING MEANS FOR HIGH VOLTAGE METAL ENCLOSED GAS INSULATED SURGE ARRESTERS

[75] Inventors: James S. Kresge, Pittsfield; Eugene C. Sakshaug, Lanesborough, both of Mass.

[73] Assignee: General Electric Company

[21] Appl. No.: 200,931

[22] Filed: Oct. 27, 1980

[51] Int. Cl.³ .............................................. H02H 9/04

[52] U.S. Cl. .................................. 361/127; 361/117; 313/231.11; 315/36

[58] Field of Search ............... 361/127, 126, 128, 131, 361/130, 132, 120, 117; 315/36; 313/231.1

[56] References Cited

U.S. PATENT DOCUMENTS

| | | | |
|---|---|---|---|
| 3,649,875 | 3/1972 | Nagai et al. | 361/130 |
| 3,753,045 | 8/1973 | Osmundsen et al. | 361/130 X |
| 3,767,973 | 10/1973 | Osmundsen et al. | 361/130 X |
| 3,821,608 | 6/1974 | Johansson et al. | 361/127 |
| 4,227,229 | 3/1979 | Imataki | 361/120 X |
| 4,234,902 | 11/1980 | Fujiwara et al. | 361/120 |

FOREIGN PATENT DOCUMENTS

| | | | |
|---|---|---|---|
| 479014 | 4/1949 | Canada | 361/130 |
| 1053431 | 2/1954 | France | 361/126 |
| 1118510 | 7/1968 | United Kingdom | 361/130 |

*Primary Examiner*—Patrick R. Salce
*Attorney, Agent, or Firm*—Robert A. Cahill

[57] ABSTRACT

Capacitance grading is provided within gas insulated lightning arresters containing stacked zinc oxide varistors by means of a grading ring electrically connected to the line terminal or, for arresters of the higher voltage ratings, by means of a plurality of telescoping external electrostatic shields. The shields are arranged so that the degree of overlap between sequential shields decreases from the line end to the ground end of the varistor stacks. The capacitance grading is provided by the degree of overlap between the sequential shields and the ratio of the radii of the overlapping shields.

7 Claims, 10 Drawing Figures

GRADING MEANS FOR HIGH VOLTAGE METAL ENCLOSED GAS INSULATED SURGE ARRESTERS

BACKGROUND OF THE INVENTION

This invention relates to high voltage arrester devices contained within gas insulated metal enclosures such as described within U.S. Pat. Nos. 3,767,973, 3,842,318 and German Pat. No. 888,132.

When a plurality of zinc oxide type varistor disks are arranged in a stack configuration and electrically connected in series, the capacitive properties of the disks creates the combination of both series capacitance circuits along the stack and parallel capacitance circuits between the individual varistors in the stack and ground. When a high voltage is applied to the line end of the stack, the electric field becomes adversely distorted resulting in a nonuniform distribution of voltage across the stack from the line end to the ground end thereof. A disproportionate share of the applied voltage appearing across the varistors closest to the line end of the stack could cause severe damage to these varistors. This is a particularly severe problem for gas insulated, metal enclosed surge arresters because of the adverse influence of the enhanced capacitance to ground caused by the presence of the metal enclosure.

The purpose of this invention is to provide a means for grading the capacitances occurring along the varistor stack in such a manner as to cause the voltage distribution to become more nearly linear.

SUMMARY OF THE INVENTION

The invention comprises arrangements for compensating for the adverse effects of abnormally high capacitance to ground in metal enclosed, gas insulated surge arresters. For arresters of lower voltage rating, the use of a simple ring extending partially down the arrester stack and connected to the line end by a predetermined plurality of support members is adequate. For higher voltage arresters a more complex arrangement of a plurality of telescoping cylindrical capacitor shields with appropriate electrical connection to the arrester stack are provided. One embodiment comprises a plurality of concentrically arranged cylindrical capacitor elements of a stepped diameter configuration with the large diameter portion of each element overlapping a preceding element. The radius and degree of overlap of each capacitor element in the stack is carefully tailored to provide the desired shielding and capacitance grading from the line end to the ground end of the stack.

DESCRIPTION OF THE PREFERRED EMBODIMENT

Figure 1A:
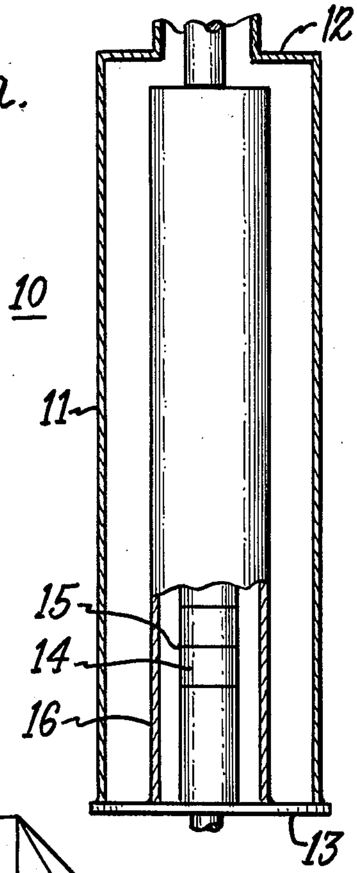
FIG. 1*a* is a front perspective view in partial section of a metal enclosed arrester without shielding.

FIG. 1*a* shows an arrester system 10 consisting of a metal container 11 sealed at the top by means of a top flange 12 and at the bottom by means of a bottom flange 13 and containing a filling of sulfur hexafluoride insulating gas ($SF_6$). A plurality of zinc oxide varistor disks 14 each with metal electrodes 15 are arranged in a stack such that each zinc oxide varistor disk 14 in the stack is electrically connected in series with each other disk. The zinc oxide varistor disks 14 are in turn contained within a porcelain housing 16 which is open at either end in order to permit the transfer of insulating $SF_6$ gas to within the vicinity of zinc oxide varistor disks 14.

Figure 1B:
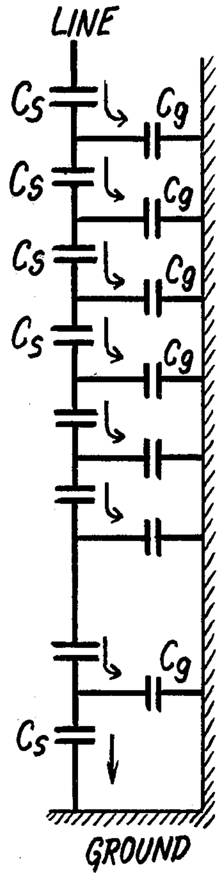
FIG. 1*b* is a schematic representation of the capacitance network of FIG. 1*a;*
Figure 1C:
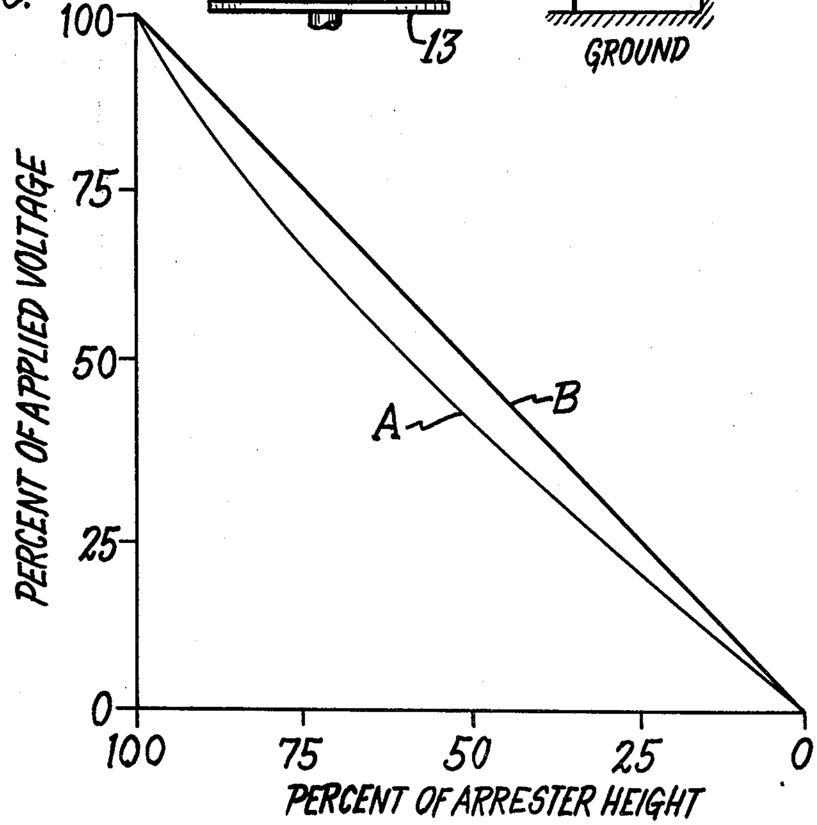
FIG. 1*c* is a graphic representation of the voltage distribution for FIG. 1*a;*

At normal operating voltage on a 60 Hz source, the disk current is primarily capacitive. The stack of disks 14 in FIG. 1*a* between line and ground is represented in the circuit of FIG. 1*b* as a series stack of capacitors, each of value $C_s$. The capacitors $C_g$ represent the stray capacitance of each disk 14 to ground. When an AC voltage is applied to the line end of such a network, capacitive current must flow in the direction depicited by arrows. It is readily seen that more current must flow through capacitors $C_s$ at the line end than at the ground end causing the voltage across the disks 14 at the line end to be greater than across those disks 14 near ground. This effect is shown in FIG. 1*c* where the voltage distribution along the stack of varistors 14 is qualitatively shown at A. B represents the ideal uniform voltage distribution that would occur if there were no ground capacitance ($C_g=0$). The voltage per disk at any point in the stack of disks 14 is defined by the slope of curve A. Near the line end of the stack of disks 14, this slope is considerably greater than the slope of curve B. The result is such that is uncorrected, disks 14 near the line end will support a disproportionate share of the total voltage and will correspondingly exhibit a higher watts loss and a decreased electrical and thermal stability.

Figure 2A:
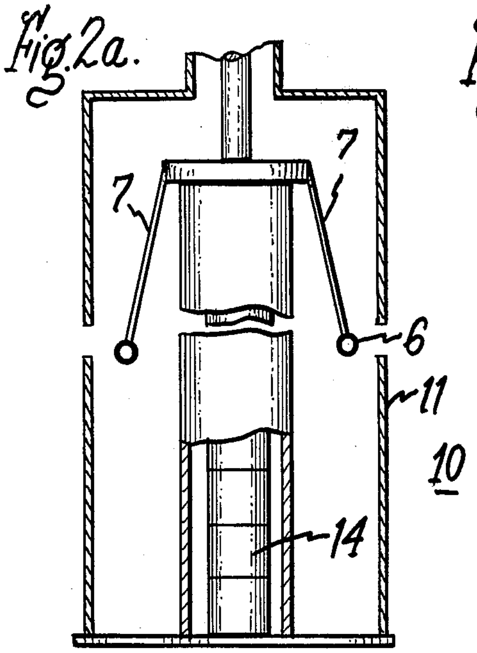
FIG. 2*a* is a front perspective view in partial section of an arrangement of a graded surge arrester using a grading ring.
Figure 2B:
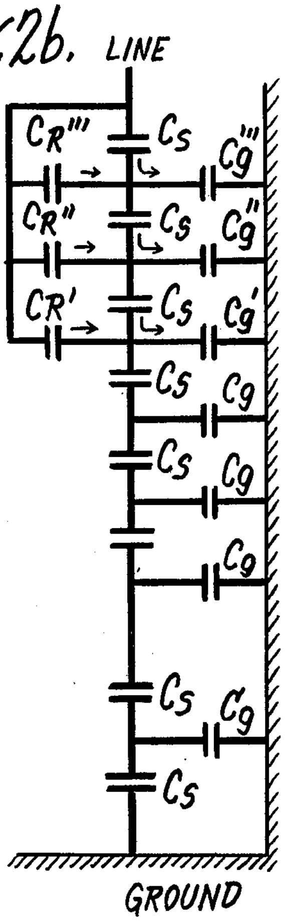
FIG. 2*b* is a schematic representation of the capacitance network of FIG. 2*a;*

It is therefore apparent that the disproportionate voltage is caused by the currents flowing in the ground capacitances $C_g$ shown in the circuit of FIG. 1*b*. One feasible solution for the lower voltage rated arresters is to provide a grading ring 6 as shown in FIG. 2. The arrester system 10 of FIG. 2*a* is similar to that of FIG. 1*a* except for the provision of grading ring 6 which is both supported by and electrically connected to the line end of assembly 10 by means of support members 7. The purpose of grading ring 6 and support members 7 is to reduce the capacitance to ground of disks 14 in the line end of the stack which is depicted as Cg', Cg'', and Cg''' in FIG. 2*b* and to provide additional capacitance CR', CR'', CR''' from line to a few of the disks 14 near the line end, particularly disks 14 close to grading ring 6 and supports 7. FIG. 2*b* shows that the currents depicted by arrows flowing into upper ground capacitances Cg', Cg'', Cg''' are partially supplied from the line by currents flowing in capacitors $C_R'$, $C_R''$, $C_R'''$.

The currents through disks 14 near the line end of the stack are thereby reduced so that the voltage distribution along the stack of disks 14 now has the configuration shown at C in FIG. *2c.* The ideal voltage distribution, with no ground capacitance, is shown at D for comparison purposes. The desired capacitance is achieved by adjusting the diameter and depth of ring 6 as well as by varying the number of support members 7. It is anticipated that adequate shielding, by means of grading ring 6, is practical for arresters used on system voltages up to 345 KV. For higher voltage arresters, however, the required diameter and depth for grading ring 6 becomes quite large so that a corresponding large and expensive container 11 must be used.

Figure 3:
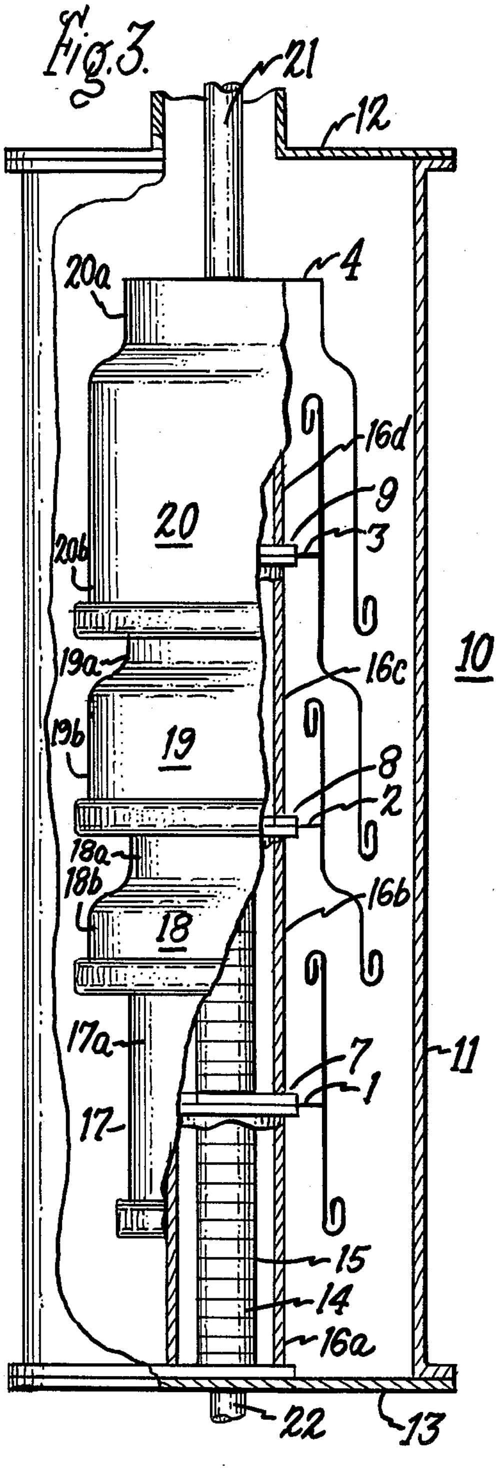
FIG. 3 is a front perspective view in partial section of a graded surge arrester using concentric cylindrical shields.

To overcome the problems involved with the higher voltage systems, an arrester system 10 containing a multiplicity of stacked series connected housings **16*a*-16*d* is shown in FIG. 3. A series of telescoped concentric cyclindrical shields 17–20 are arranged in a predetermined manner and electrically connected to the junction points (7–9) between housings 16*a*-16*d* such that the capacitance between cylindrical shields 17–20 forces a uniform voltage distribution between housings 16*a*-16*d*. The number of housings 16*a*-16*d* is selected such that the voltage rating for each housing 16*a*-16*d* is low and the voltage distribution within each housing 16*a*-16*d* is relatively uniform. It is anticipated that an upper limit for the voltage rating for each housing 16*a*-16*d* is in the order of 100 KV. A total of four housings 16*a*-16*d*, as shown, would be employed in the design of a 396 KV arrester for use on a 550 KV system. Arrester system 10 also contains metal container 11 sealed at the top by means of top flange 12 and at the bottom by means of bottom flange 13 and containing a filling of insulating $SF_6$ gas as described for the arrester system of FIG. 1*a*.**

Four porcelain housings **16*a*-16*d* are stacked within metal container 11, one above the other, and each housing 16*a*-16*d* contains a plurality of zinc oxide disks 14 with metal electrodes 15 arranged in a stack such that each individual disk 14 is electrically connected in series with each other disk 14. Porcelain housings 16*a*-16*d* are terminated at each end by metal flanged fittings 30 to facilitate bolting them together and provision is made for venting to the surrounding $SF_6$ atmosphere to permit transfer of the insulating $SF_6$ gas within container 11 to within the vicinity of zinc oxide disks 14**.

In order to provide capacitive grading along the stack of housings **16*a*-16*d*, first, second, third, and fourth cylindrical shields 17–20 are employed in the following manner. Each of the cylindrical shields 18–20 consists of a linear portion, such as 20*a*, and a bell-shaped portion, such as 20*b*. The lowermost cylindrical shield 17 is of a single diameter only, equal to that of the linear portions of shields 18 to 20. Each cylindrical shield 17–20 is concentrically arranged around porcelain housings 16*a*-16*d* such that fourth cylindrical shield 20 overlaps third cylindrical shield 19 to a greater extent than third cylindrical shield 19 overlaps second cylindrical shield 18, and second cylindrical shield 18 overlaps first cylindrical shield 17 to a lesser extent than third cylindrical shield 19 overlaps second cylindrical shield 18. Electrical line connection is brought into top flange 12 by means of top conduit 21 and the stack becomes connected to ground by means of bottom conduit 22. Shields 17–20 are electrically connected to adjacent flanges 30 by means of conductive supports 1–4 respectively. A capacitive distribution of voltage is developed between bell portion 20*b* of fourth cylindrical shield 20 and linear portion 19*a* of third cylindrical shield 19, between bell portion 19*b* of third cylindrical shield 19 and linear portion 18*a* of second cylindrical shield 18 and bell portion 18*b* of second cylindrical shield 18 and the first cylindrical shield 17**.

Figure 4:
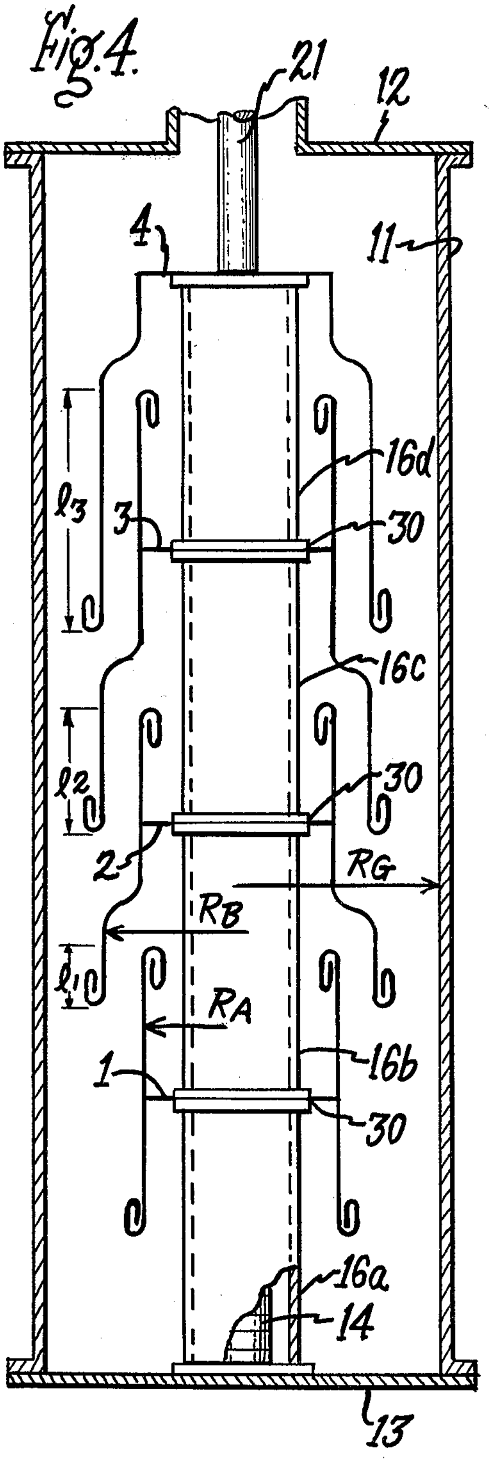
FIG. 4 is a side sectional view of the concentric cylindrical shielded embodiment of FIG. 3.

FIG. 4 illustrates the relationship between the distance of overlap $l_1$ between first cylindrical shield 17 and second cylindrical shield 18, the distance of overlap $l_2$ between second shield 18 and third shield 19 and the distance of overlap $l_3$ between fourth shield 20 and third shield 19. The radius of linear portions **17*a*-20*a* of shields 17–20 is designated $R_A$ and the radius of bell shape portions 18*b*-20*b* of shield 18–20 is designated $R_B$. The radius of grounded metal container 11** is designated $R_G$. The capacitance between any two concentric cylinders of overlapping length l in centimeters, radius $R_A$ and radius $R_B$ in centimeters, is given by the expression:

$$C = \frac{(1.1127\, l)}{(2 1n\, R_B/R_A)} \text{ picofarads}$$

This expression allows both the intershield capacitances to be determined as well as the capacitance from each cylindrical shield 17–20 to the grounded metal container 11.

For the embodiments depicted in FIGS. 3 and 4, shields 17–20 are described as comprising metal cylinders. Cylindrical shields 17–20 are used for capacitive purposes by providing capacitive charging currents in a manner to be described below and do not carry power current at any time. Shields 17–20 can, therefor, be made very thin and can even comprise a metal foil wound on an insulating tube such as paper or fiber board.

Figures 5, 6:
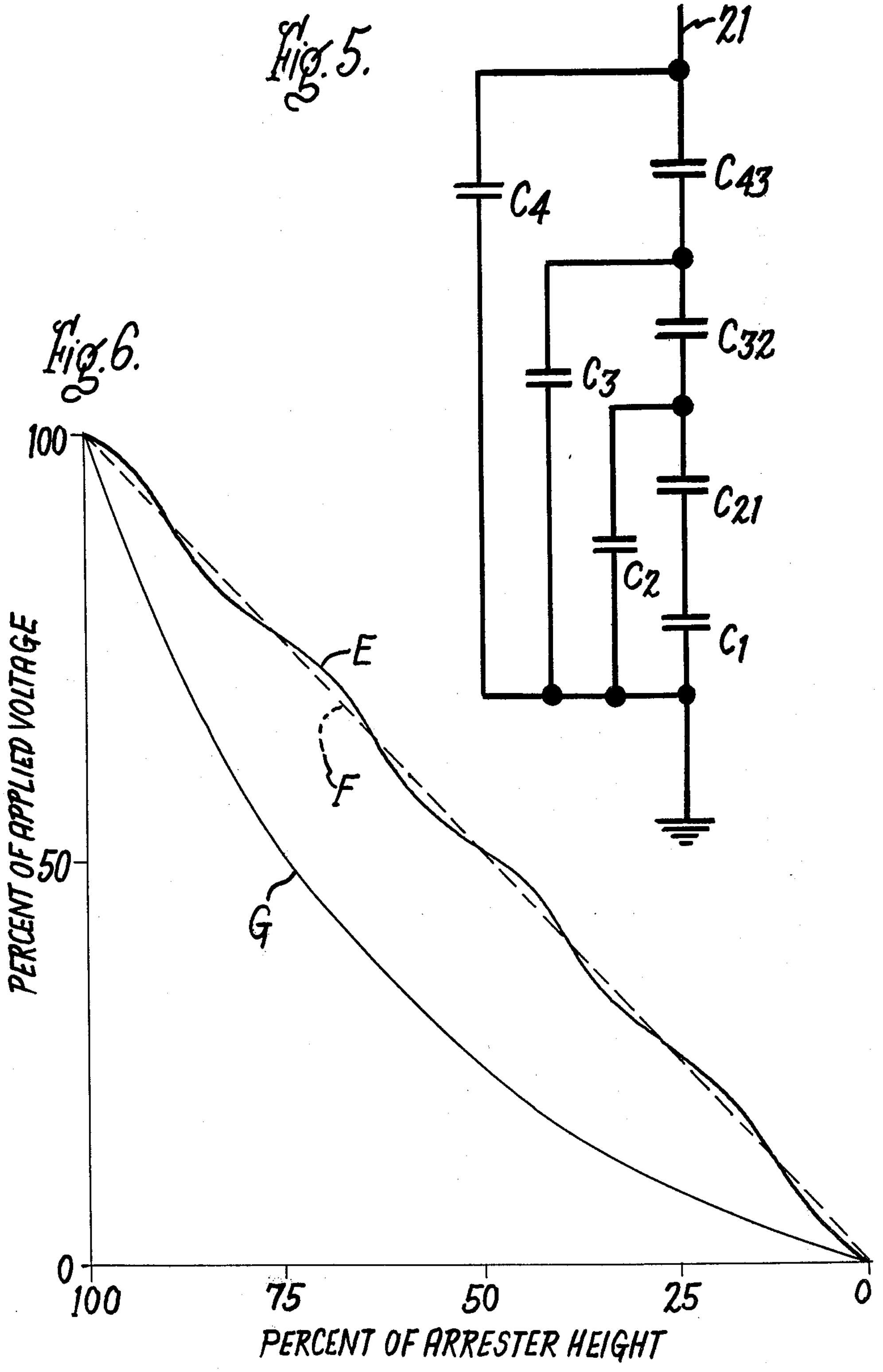
FIG. 5 is an electrical schematic depicting the capacitances of FIG. 4.
FIG. 6 is a graphic representation of the voltage distribution in the arrester of FIG. 4.

The schematic diagram representing the relationship between the capacitances existing within systems 10 of FIGS. 3 and 4 is shown in FIG. 5 as follows. The capacitance to ground for first cylindrical shield 17, second cylindrical shield 18, third cylindrical shield 19 and fourth cylindrical shield 20 is represented by $C_1$, $C_2$, $C_3$, and $C_4$, respectively. The intershield capacitance existing between second cylindrical shield 18 and first cylindrical shield 17 is given by $C_{21}$, between third cylindrical shield 19 and second cylindrical shield 18 is given by $C_{32}$ and between fourth cylindrical shield 20 and third cylindrical shield 19 by $C_{43}$. The primary function of shields 17–20 is to provide capacitive grading such that the voltage from line 21 to ground will divide equally among housings **16*a*-16*d*. For the voltage to divide equally in the schematic diagram of FIG. 5, the voltages across $C_1$, $C_{21}$, $C_{32}$, and $C_{43}$ must all equal one quarter of the voltage from line terminal 21** to ground. In order to provide the required voltage division, the capacitance relationships must be as follows:

(1) $C_{21}=C_1$
(2) $C_{32}=2C_2+C_1$
(3) $C_{43}=3C_3+2C_2+C_1$

Appropriate dimensions for electrostatic shields 17–20 and for metal container 11 of FIGS. 3 and 4 are $R_A$, $R_B$, $R_G$, $l_1$, $l_2$, and $l_3$. A preliminary design for a 396 KV rated arrester for use in a 550 KV AC system, as one example, required the following dimensions.

| | |
|---|---|
| Height of porcelain housing 16 | 42" |
| Outside diameter of porcelain housing 16 | 10" |

-continued

| | |
|---|---|
| Radius of lower portions (17,18a–20a) $R_A$ | 11" |
| Radius of upper portions (18b–20b) $R_B$ | 13" |
| Radius of metal container 11 $R_G$ | 24" |
| Overlapping length (17–18) $l_1$ | 7.25" |
| Overlapping length (18–19) $l_2$ | 20.5" |
| Overlapping length (19–20) $l_3$ | 39.25" |

The dimensions given are for providing equal distribution of voltage between housings 16*a*-16*d*. The distribution of voltage between disks 14 within any housing 16*a*-16*d* must be separately determined. Each housing 16*a*-16*d* in FIGS. 3 and 4 is completely enclosed by one of the cylindrical shields 17–20 connected such that there is no stray capacitance to ground. Since the shield arrangement is identical for each housing 16*a*-16*d* the voltage distribution within each housing 16*a*-16*d* will be the same.

Figure 2C:
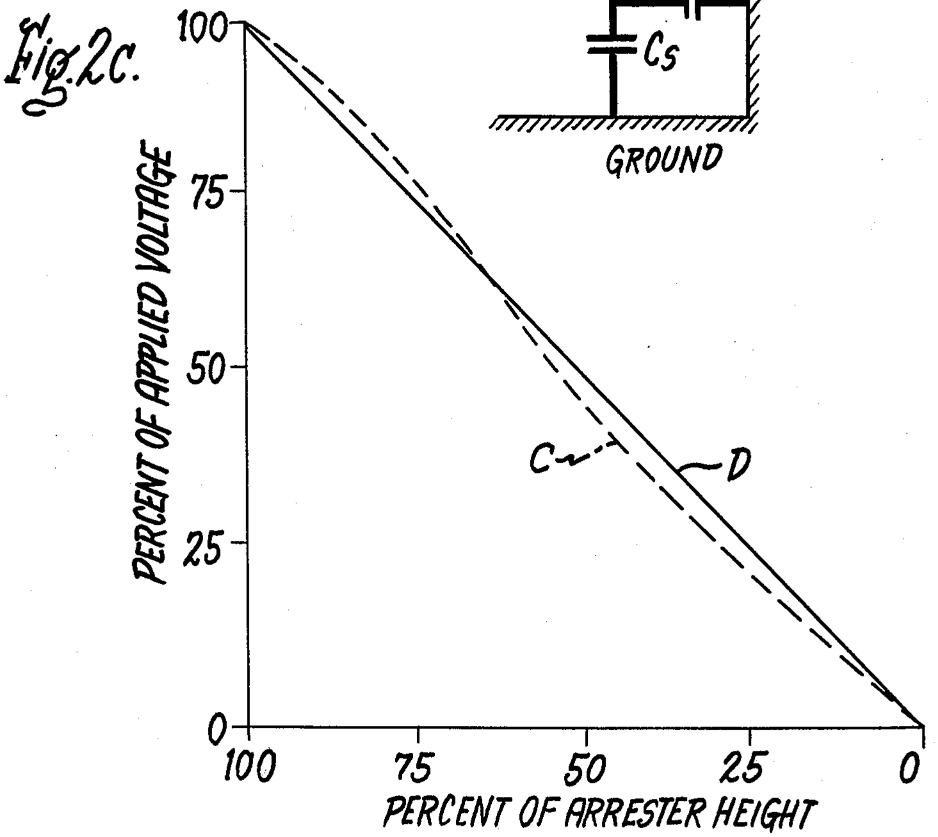
FIG. 2*c* is a graphic representation of the voltage distribution for FIG. 2*a;*

In the practical case where each housing 16*a*-16*d* is rated at about 100 KV and with reasonable dimensions for $R_A$, $R_B$, and $R_G$, the voltage distribution within housings 16*a*-16*d* will approximate that shown at C in FIG. 2C. The distribution of voltages across all four housings 16*a*-16*d* in series is depicted in FIG. 6. The actual voltage distribution is shown as a solid curve E. The ideal voltage distribution with no ground capacitance is shown at F in dotted lines for comparison. The voltage distribution in the absence of any capacitance shielding is shown at G.

What is claimed as new and which it is desired to secure by Letters Patent of the United States is:

1. A surge arrester assembly having graded capacitance comprising:

a plurality of zinc oxide varistor discs arranged in a stack provided with a line connection at one end and a ground connection at an opposite end;

a metal housing coextensive with said varistor stack; and a succession of capacitor shields encompassing said varistor stack, each said shield electrically connected to a point in the portion of said stack encompassed thereby, some of said shields having a large diameter portion and a small diameter portion with the large diameter portion of one shield in spaced overlapping relation with the small diameter portion of a successive shield to provide intershield capacitance at the regions of overlap.

2. The system of claim 1 wherein said capacitance shield cylinders have a greater intershield capacitance at said line end than at said ground end of said housing.

3. The arrester assembly of claim 1 wherein the capacitor shields at said line end overlap each other to a greater extent than said capacitor shields at said ground end of said stack in order to provide a greater intershield capacitance at said line end than said ground end of said stack.

4. The arrester assembly of claim 1 wherein said capacitance shields are selected from the group consisting of metals and metal-covered insulators.

5. The arrester assembly of claim 1 further including an insulating housing coextensive with said varistor stack and intermediate said stack and said metal housing.

6. The arrester assembly of claim 1 further including a filling of an insulating gas selected from the group consisting of $SF_6$ and $N_2$.

7. The arrester assembly defined in claims 1 or 3 wherein said shields having large and small diameter portions are oriented with their small diameter portions directed toward the line end of said stack and the one of said shields at the ground end of said stack being a straight cylinder having a diameter conforming to the small diameter portions of the other shields and being partially overlapped by the large diameter portion of the adjacent one of said shields.

* * * * *